May 22, 1928.

C. D. CUTTING

UNIVERSAL JOINT

Filed Nov. 13, 1926

1,670,612

INVENTOR
CHARLES D CUTTING.
BY
ATTORNEY

Patented May 22, 1928.

1,670,612

UNITED STATES PATENT OFFICE.

CHARLES D. CUTTING, OF DETROIT, MICHIGAN.

UNIVERSAL JOINT.

Application filed November 13, 1926. Serial No. 148,208.

It is the primary object of my invention to provide a universal joint which shall be of simple and economical construction, shall provide for proper and adequate lubrication as well as means for holding lubricant against escape and which shall also provide an adjustable bearing surface to receive end thrust.

With the above and other objects in view, my invention consists in the arrangement, combination and construction of the various parts of my improved device as described in the specification, claimed in my claims and shown in the accompanying drawings, in which:

Figure 1:
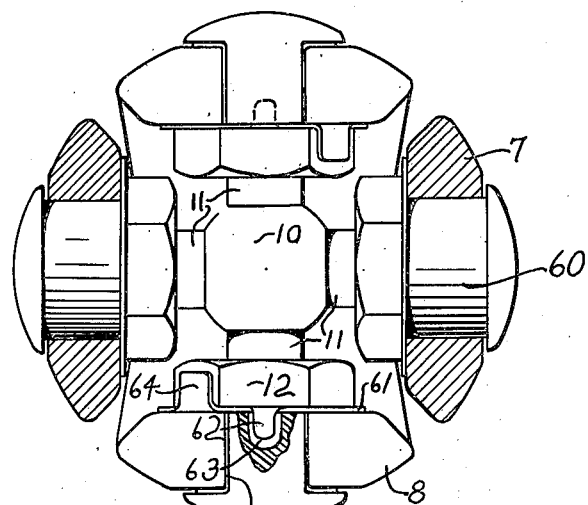
Fig. 1 is an end view of my improved joint.
Figure 2:
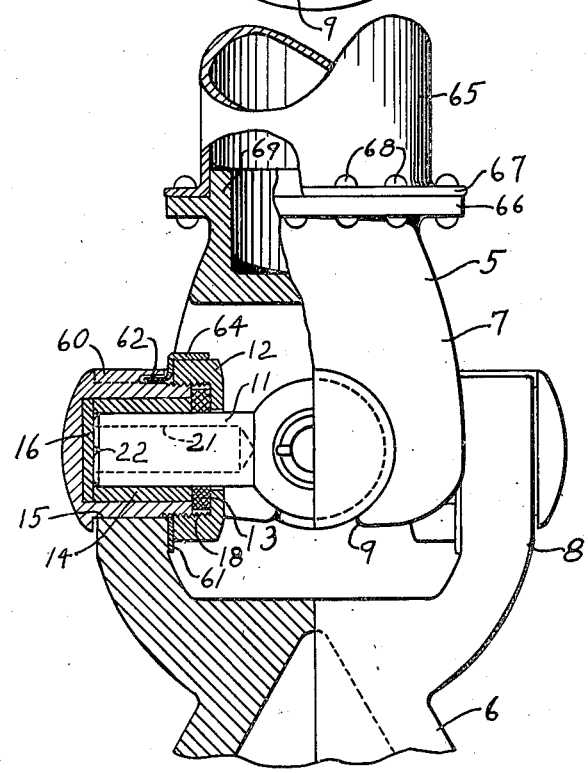
Fig. 2 is a top or plan view of the same with certain parts broken away to better illustrate the invention.

I have shown a pair of shaft or yoke members 5 and 6, the member 5 having yoke arms 7 and the member 6 having yoke arms 8. Each of the arms 7 and 8 is provided with a slot 9 in its outer end. I have also provided a conventional cross comprising a central portion 10 having the diverging arms 11, each arm being adapted to pass through the slot 9 and engage in the end of either an arm 7 or an arm 8.

After the cross 10 has been positioned with two of its arms 11 engaging the ends of the arms 8 and the remaining two of the arms 11 engaging in the ends of the arms 7 (each arm 11 having the nut or cap 12 and lubricant retaining washer 13 slipped over the same prior to assembly) a unit, comprising bushing 14 pressed into sleeve 15 and a hardened steel washer 16 secured between the outer end of the bushing 14 and the closed end of the sleeve 15 may be inserted endwise through the openings in the arms 7 and 8 to engage the bushings 14 with the arms 11. The caps 12 may then be screwed onto the inner ends of the sleeves 15 as at 18 until the caps press against the yoke arms. Further rotation of the caps 12 will then draw the sleeves 15 inwardly until the hardened steel washer 16 engages the end of its adjacent arm 11. Thus provision is made for suitably positioning the washers 16 against the end of adjacent arms 11 so as to take end thrust from the arm. Lubricant may be contained in the hollow bore 21 of each arm 11 and passed therefrom through the groove 22 to the bearing surfaces. The washer 13, being held by the inner end of the bushing 14 and the end of the cap 12, will act as a seal against escape of the lubricant.

In order to provide locking means for the sleeve 15 and cap 12, I provide a projection 60 on the top of each sleeve conforming in size to and laying within its adjacent slot 9, so that the sleeve is held against rotation. A washer 61 is provided between the inner end of sleeve 15 and cap 12, said washer having a projection 62 which extends into an opening 63 in the projection 60. Another projection 64 on the washer 61 normally extends radially therefrom, but after the cap 12 has been screwed home, the projection 64 may be bent against one of the flat faces of the hexagon forming the exterior of the cap 12, thus locking the cap to the sleeve.

I have also shown a highly desirable construction for joining the yoke 5 to a propeller shaft 65. In conventional practice, the tubular shaft 65 is welded to the yoke, requiring a large wall thickness in the tubing. It is practically impossible to commercially produce thick wall tubing which is uniform throughout, with the result that unequal weights in the shaft produce a shaft whip. I provide the yoke 5 with a flange 66, so that the thin wall tubing 65 may be bent outwardly to produce a similar flange 67 and the two flanges may be riveted together by rivets 68. The end 69 of the yoke serves to center the tubing. Because the tubing is not welded to the yoke, it is not necessary to provide a thick wall, equal to the thickness of the forged yoke, and it is well known that thin wall tubing is much more uniform in weight distribution than thick wall tubing. Thus, whipping of the shaft because of unequal weight distribution is avoided.

It becomes readily apparent that I have provided a simple and economical construction of universal joint wherein proper lubrication of the working parts is provided for as well as means for sealing the same against loss of lubricant. It also becomes apparent that I have provided simple and efficient means for adjusting against end thrust wear as well as a joint which may be easily and quickly assembled and disassembled.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. A universal joint comprising a pair of yokes having slots in their outer ends, a cross having arms engageable in said yokes through said slots, a bushing insertible endwise in each of said yokes and engaged over said cross arms and a nut screwed on the inner end of each bushing locating it in the yoke.

2. A universal joint comprising a pair of yokes having slots in their outer ends, a cross having arms engageable in said yokes through said slots, a sleeve insertible endwise in each of said yokes, said sleeves having a diameter greater than the width of said slots and having interior bearings in which said arms may reciprocate and a nut screwed on the inner end of each bushing locating it in the yoke.

3. A universal joint comprising a pair of yokes having slots in their outer ends, a cross having arms engageable in said yokes through said slots, a sleeve insertible endwise in each of said yokes, said sleeves having a diameter greater than the width of said slots and having interior bearings in which said arms may reciprocate and also having end thrust bearing surfaces against which the ends of the arms may bear, and a nut disposed around each arm and threaded on each sleeve for adjusting the sleeve longitudinally for end thrust wear.

4. A universal joint comprising a pair of yokes having slots in their outer ends, a cross having arms engageable in said yokes through said slots, a sleeve insertible endwise in each of said yokes, said sleeves having a diameter greater than the width of said slots and having interior bearings in which said arms may reciprocate, said sleeves having abutments at their outer ends, a hardened washer inserted in each sleeve and pressing the abutment on one side and the end of the adjacent arm on the other, and means for adjusting said sleeve and washer for end thrust wear.

5. A universal joint comprising yoke arms and cross arms positioned therein, a sleeve on each of said cross arms having an end thrust bearing in the outer end thereof and a nut threaded on the inner end of each sleeve for adjusting it longitudinally.

6. A universal joint comprising yoke arms and cross arms positioned therein, a sleeve on each of said cross arms having an end thrust bearing in the outer end thereof and a nut threaded on the inner end of each sleeve for adjusting it longitudinally, each said nut pressing at its outer end against a yoke arm.

7. A construction as set forth in claim 3 wherein each of said sleeves is provided with a projection disposed in the slot of its adjacent yoke arm, and a washer is disposed between the inner end of the sleeve and the cap, said washer having a projection extended into an opening in the sleeve projection and another projection bent against the nut to lock it to the sleeve.

8. A universal joint comprising yoke arms and cross arms positioned therein, a sleeve on each of said cross arms within the yoke arms, and a nut threaded on the inner end of each sleeve for locating it in its yoke arm.

9. A universal joint comprising yoke arms and cross arms positioned therein, a sleeve on each of said cross arms within the yoke arms, and a nut threaded on the inner end of each sleeve for locating it in its yoke arm, each of said nuts pressing against its adjacent yoke arm.

10. A universal joint comprising yoke arms and cross arms positioned therein, a sleeve on each of said cross arms within the yoke arms, the outer ends of said sleeves being closed, a nut threaded on the inner end of each sleeve for locating it in its yoke arm and packing carried between each nut and the inner end of its sleeve to close said end.

11. A universal joint comprising yoke arms and cross arms positioned therein, a sleeve on each of said cross arms within the yoke arms, the outer ends of said sleeves being closed, a nut threaded on the inner end of each sleeve for locating it in its yoke arm, packing carried between each nut and the inner end of its sleeve to close said end, each nut having a flange extending transversely of the sleeve for holding its packing.

CHARLES D. CUTTING.